UNITED STATES PATENT OFFICE.

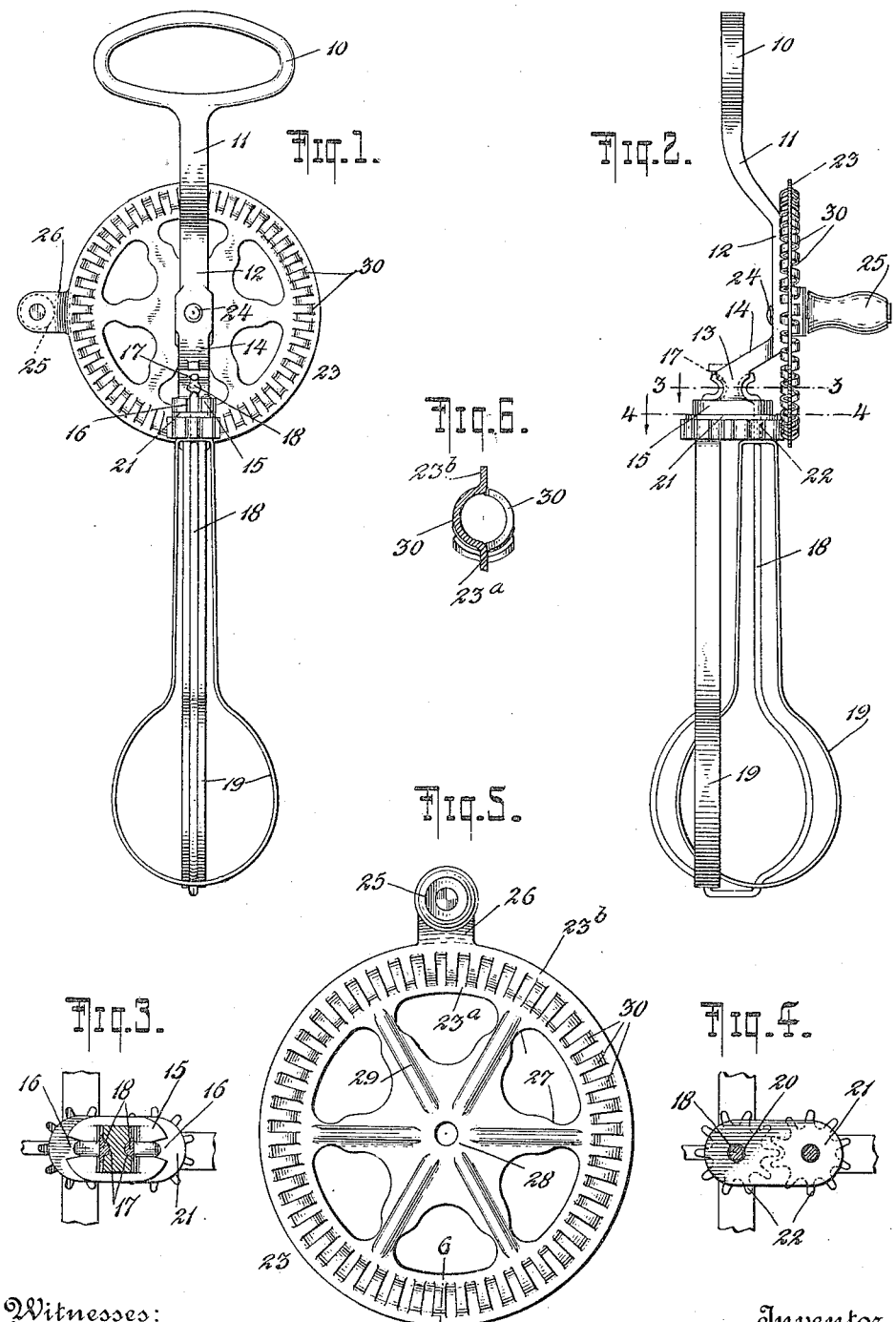

SIDNEY C. HILLS, OF TORRINGTON, CONNECTICUT, ASSIGNOR TO THE TURNER & SEYMOUR MANUFACTURING CO., OF TORRINGTON, CONNECTICUT, A CORPORATION OF CONNECTICUT.

GEAR-WHEEL.

1,206,327.  Specification of Letters Patent.  Patented Nov. 28, 1916.

Application filed November 4, 1915. Serial No. 59,561.

*To all whom it may concern:*

Be it known that I, SIDNEY C. HILLS, a citizen of the United States, and resident of Torrington, county of Litchfield, State of Connecticut, have invented certain new and useful Improvements in Gear-Wheels, of which the following is a specification.

My invention relates to gear wheels and has for its object to provide a gear wheel which is simple and cheap to manufacture, extremely strong and rigid, light in weight and of a pleasing and symmetrical design.

My improvement will be fully described hereinafter and the features of novelty will be pointed out in the appended claims.

In the accompanying drawings I have shown my improvement operatively combined with an egg-beater, it being understood that this is only an example used for illustrative purposes.

In said drawings Figure 1 is a front elevation of a beater including my improved gear wheel; Fig. 2 is a side elevation; Fig. 3 is a horizontal section on the line 3—3 of Fig. 2; Fig. 4 is a similar view on the line 4—4 of Fig. 2; Fig. 5 is an enlarged face view of my improved gear wheel and Fig. 6 is a section on the line 6—6 of Fig. 5.

As shown in the drawings the beater comprises a handle 10 forming part of a shank 11 having an upright bearing member 12 and terminating in a neck 13 which is preferably formed with opposite inwardly curved surfaces and is connected with the member 12 for instance by means of an inclined member 14 as shown in Fig. 1. The neck 13 forms a continuation of an enlarged head 15, as shown in Figs. 2 and 3, the handle 10, shank 11, member 12, neck 13, member 14 and head 15 being preferably cast as one integral unit. The head 15 is preferably provided with laterally extending open recesses 16 located at opposite ends of said head and continuing lengthwise along inwardly curved surfaces of the neck 13, as indicated at 17, the said recesses thus also having an inward curve. The said recesses 17 with the recesses 16 may be formed when the handle section is cast thus eliminating the necessity for machining the casting in any way or for drilling holes therein after the casting has been completed. The device further includes the usual wires 18 on which the customary beater floats 19 are rotatably supported, the said wires 18 extending through openings 20 in a plate 21 located in surface engagement with the free end face of the head 15. The free ends of the wires 18 also extend through the recesses 16 of the head 15 and are bent inwardly immediately above said head to fit into the recesses 17 in which said ends may be secured in any suitable manner and preferably by crimping them therein. It will be understood that the distance between the openings 20 in the plate 21 is such that the wires 18 will be firmly held at the inner ends of the recesses 16 and 17 against any tendency to spread apart and become disconnected from the handle section. The head 15 forms a rest at one end of each recess 17 against which the bends of the wires 18 are firmly seated whereby a lengthwise movement of said wires in one direction relatively to the handle section is prevented, the inwardly bent portions of said wires 18 in coöperation with the recesses 17 also preventing a relative movement between the handle sections and the wires 18 in the opposite direction. By crimping said wires in said recesses an additional means for rigidly connecting the wires and handle section together is provided.

Pinions 22 are connected with each beater float and are in operative engagement with each other, said pinions 22 being rotatably mounted on the wires 18 and in the present case engaging the plate 21 which thus forms a bearing for said pinions. This plate 21 is preferably constructed of some metal other than the cast metal of which the handle section and pinions 22 are formed so that by bringing two different kinds of metal into engagement with each other, or in other words by having the pinions 22 of one metal rotate on the plate 21 of another metal, an extremely efficient bearing for said pinions is secured and the life of the latter is materially prolonged. The plate 21, in addition to serving as a means for rigidly maintaining the wires 18 against spreading therefore also provides a bearing surface for the pinions 22 which as a result of this arrangement rotate very easily and with a minimum of friction and a maximum of efficiency.

The means whereby rotary motion is transmitted to the beater floats 19 and the beater is operated comprises a gear 23 journaled at 24 upon the bearing member 12 of the handle section and in the illustrated example meshing with one of the pinions 22, actuation of said gear being facilitated by means of a handle 25 preferably carried by a projection 26 extending radially from the gear 23 as shown in Figs. 1 and 5. The gear 23 as shown is of special construction and as illustrated comprises a rim 23ª and spokes or their equivalent 27 connected with a central hub portion 28, the spokes 27, if desired, being provided with ribs 29 extending lengthwise thereof whereby the stiffness and rigidity of the gear are increased. The teeth 30 of said gear 23 are arched or otherwise shaped transversely of the rim 23ª and extend alternately in opposite directions therefrom, it being understood that the entire gear including the teeth 30 and projection 25 is formed by being stamped from a suitable metal blank. The teeth 30 themselves are formed by providing or forming radial slits or cuts in the rim 23ª, and located entirely within said rim and then forcing the material between said cuts outwardly preferably in opposite directions alternately. It will be noted that the ends of the stamped out strips which form the teeth 30 remain integrally connected with the rim and thus provide an extremely rigid and strong construction, a peripheral rim 23ᵇ remaining in connection with the outer ends of the strips which form the teeth 30. The transverse arching or equivalent shaping of said teeth also increases the strength of the gear at its periphery where said gear is subjected to the greatest strains and in addition to this by providing alternate teeth which project in opposite directions a symmetrical design is produced which materially enhances the appearance of the gear 23. Such oppositely projecting teeth also make it possible to readily reverse the gear faces so that after one set of teeth has become inoperative the other set may be utilized to operate the pinions 22 thus materially prolonging the usefulness of the entire device and furthermore making it unnecessary to exercise any special care in initially placing the gear in operative position in the beater as either set of teeth is capable of being operatively connected with the pinions.

By constructing the gear 23 as described and by stamping it from a metal blank the weight thereof is reduced to a minimum without sacrificing strength so that the weight of the beater as a whole is materially less than similar devices in which cast metal gears are employed. The said gear 23 may be used in combination with cast iron pinions as shown or with pinions also stamped from metal blanks as may be desired or with egg beaters other than as shown and as will be readily apparent is not restricted to use in connection with egg beaters but on the contrary is capable of being used in many other types of mechanisms with equal efficiency.

It will be understood that the shape of the spokes 27 as well as the transverse shape of the teeth 30 may be changed to produce gears of a variety of different designs, it being further obvious that in some cases the ribs 29 may be omitted if found unnecessary.

Various changes in the specific form shown and described may be made within the scope of the claims without departing from the spirit of my invention.

I claim:

1. A gear wheel comprising a sheet of material and radial teeth projecting alternately from opposite surfaces of said sheet, said teeth having their opposite ends integrally connected with said sheet.

2. A gear wheel comprising a sheet of material, radial strips projecting outwardly from said sheet to form teeth and a peripheral rim integrally connected with said teeth.

3. A gear wheel comprising a sheet of material, radial strips arched outwardly and projecting alternately from opposite surfaces of said sheet to form teeth and a peripheral rim integrally connected with all of said teeth.

4. A gear wheel comprising a sheet of material and radial strips having their intermediate portions bulged outwardly alternately in opposite directions to form teeth and their opposite ends integral with said sheet.

5. A gear wheel comprising a main portion, a peripheral rim and a series of strips each of which is formed integrally with said main portion and peripheral rim and bulged outwardly intermediate thereof to form teeth.

6. A gear wheel comprising a main portion, a peripheral rim and a series of strips each of which is formed integrally with said main portion and peripheral rim and bulged outwardly intermediate thereof alternately in opposite directions parallel to the axis of said wheel to form teeth.

7. The process of forming teeth on gear wheels which consists in forming radial cuts in a sheet of material extending from points inside of the periphery of the wheel toward the axis thereof and then forcing the material between said cuts outwardly beyond a surface of said wheel.

8. The process of forming teeth on gear wheels which consists in forming radial cuts in a sheet of material extending from points inside of the periphery of the wheel toward the axis thereof and then forcing the material between pairs of cuts outwardly in opposite direction beyond the opposite surfaces of said wheel.

In testimony whereof I have hereunto set my hand.

SIDNEY C. HILLS.

Copies of this patent may be obtained for five cents each, by addressing the "Commissioner of Patents, Washington, D. C."